(12) United States Patent
Delioussine et al.

(10) Patent No.: US 11,990,593 B2
(45) Date of Patent: May 21, 2024

(54) BATTERY PACK DESIGN AND METHOD

(71) Applicant: SoftBank Corp., Tokyo (JP)

(72) Inventors: Peter Delioussine, Newbury Park, CA (US); Brian Jensen, West Hills, CA (US)

(73) Assignee: SoftBank Corp., Tokyo (JP)

( * ) Notice: Subject to any disclaimer, the term of this patent is extended or adjusted under 35 U.S.C. 154(b) by 403 days.

(21) Appl. No.: 17/452,068

(22) Filed: Oct. 25, 2021

(65) Prior Publication Data

US 2022/0045385 A1 Feb. 10, 2022

Related U.S. Application Data

(63) Continuation of application No. PCT/US2020/029971, filed on Apr. 24, 2020.

(60) Provisional application No. 62/898,543, filed on Sep. 10, 2019, provisional application No. 62/854,711, filed on May 30, 2019, provisional application No.
(Continued)

(51) Int. Cl.
| | |
|---|---|
| *H01M 10/625* | (2014.01) |
| *H01M 10/6552* | (2014.01) |
| *H01M 10/658* | (2014.01) |
| *H01M 50/204* | (2021.01) |
| *H01M 50/249* | (2021.01) |
| *H01M 50/308* | (2021.01) |

(52) U.S. Cl.
CPC ..... *H01M 10/625* (2015.04); *H01M 10/6552* (2015.04); *H01M 10/658* (2015.04); *H01M 50/204* (2021.01); *H01M 50/249* (2021.01); *H01M 50/308* (2021.01); *H01M 2220/20* (2013.01)

(58) Field of Classification Search
CPC .......... H01M 10/625; H01M 10/6552; H01M 10/658; H01M 50/249; H01M 50/308; H01M 50/204; H01M 2220/20
See application file for complete search history.

(56) References Cited

U.S. PATENT DOCUMENTS

| | | | |
|---|---|---|---|
| 2006/0073375 A1 | 4/2006 | Hong | |
| 2010/0323234 A1* | 12/2010 | Kim | H01M 50/574 429/158 |
| 2011/0045327 A1 | 2/2011 | Yawata | |

(Continued)

FOREIGN PATENT DOCUMENTS

| | | |
|---|---|---|
| CN | 208422998 U | 1/2019 |
| CN | 208637482 U | 3/2019 |

(Continued)

OTHER PUBLICATIONS

Office Action issued for counterpart Japanese Application No. 2021-563594, issued by the Japanese Patent Office on Nov. 1, 2022 (drafted on Oct. 25, 2022).

(Continued)

*Primary Examiner* — John J Lee (57) ABSTRACT

In at least one embodiment, provided is a battery pack for a vehicle including a thin firebox for enclosing batteries and containing thermal runaway gases, thermal insulation surrounding the firebox, and a vent hole extending through the firebox and the thermal insulation to an exterior of the vehicle with vent hole plug and a pressure relief frangible vent cover at least partially covering the vent hole plug to retain it within the vent hole.

16 Claims, 10 Drawing Sheets

Related U.S. Application Data

62/838,926, filed on Apr. 25, 2019, provisional application No. 62/838,783, filed on Apr. 25, 2019.

(56) References Cited

U.S. PATENT DOCUMENTS

| | | |
|---|---|---|
| 2012/0000548 A1 | 1/2012 | Khamitkar |
| 2012/0169195 A1 | 7/2012 | Eckstein |
| 2012/0196162 A1 | 8/2012 | Shiraishi |
| 2012/0219834 A1* | 8/2012 | Park .................. H01M 50/3425 429/89 |
| 2013/0095356 A1 | 4/2013 | Shimizu |
| 2016/0181676 A1 | 6/2016 | Nubbe |
| 2016/0293917 A1 | 10/2016 | Matsudo |
| 2017/0054121 A1* | 2/2017 | Hore .................. H01M 10/6571 |
| 2017/0077468 A1 | 3/2017 | Gerundt |
| 2017/0324110 A1 | 11/2017 | Fujii |
| 2017/0352935 A1 | 12/2017 | Perdu |
| 2017/0358831 A1 | 12/2017 | Milroy |
| 2018/0123104 A1* | 5/2018 | Lomax .............. H01M 50/3425 |
| 2019/0296293 A1 | 9/2019 | Scharner |
| 2020/0220240 A1 | 7/2020 | Cheng |

FOREIGN PATENT DOCUMENTS

| | | |
|---|---|---|
| DE | 102016225057 A1 | 6/2018 |
| EP | 2293364 A1 | 3/2011 |
| JP | 2006080065 A | 3/2006 |
| JP | 2007018827 A | 1/2007 |
| JP | 2007087731 A | 4/2007 |
| JP | 2007220508 A | 8/2007 |
| JP | 2010135247 A | 6/2010 |
| JP | 2012178333 A | 9/2012 |
| JP | 2013196850 A | 9/2013 |
| JP | 2015018706 A | 1/2015 |
| JP | 2015099675 A | 5/2015 |
| JP | 2018174092 A | 11/2018 |
| WO | 2018187901 A1 | 10/2018 |

OTHER PUBLICATIONS

Office Action issued for counterpart European Application No. 20794545.2, issued by the European Patent Office on Feb. 17, 2023.
International Search Report and (ISA/237) Written Opinion of the International Search Authority for International Patent Application No. PCT/US2020/029971, mailed by the United States Patent and Trademark Office on Jul. 1, 2020.
International Search Report and (ISA/237) Written Opinion of the International Search Authority for International Patent Application No. PCT/US2020/029975, mailed by the United States Patent and Trademark Office on Jul. 1, 2020.
Extended European Search Report for European Patent Application No. 20794545.2, issued by the European Patent Office on Jun. 8, 2022.
Extended European Search Report for European Patent Application No. 20796157.4, issued by the European Patent Office on Jun. 8, 2022.
Office Action issued for related U.S. Appl. No. 17/452,067, issued by the US Patent and Trademark Office on Jan. 19, 2024.

* cited by examiner

BATTERY PACK DESIGN AND METHOD

The contents of the following US and PCT applications are incorporated herein by reference:
Ser. No. 62/838,783 filed in US on Apr. 25, 2019
Ser. No. 62/838,926 filed in US on Apr. 25, 2019
Ser. No. 62/854,711 filed in US on May 30, 2019
Ser. No. 62/898,543 filed in US on Sep. 10, 2019, and
No. PCT/US2020/029971 filed in WO on Apr. 24, 2020

BACKGROUND

High altitude long endurance solar powered aircraft have extensive batteries to ensure that the aircraft can maintain flight for long periods of time, which may even be through the night when solar charging is not an option. When there is diminished sunlight or no sunlight the aircraft must rely on stored battery power. As such, in high altitude long endurance aircraft, or in terrestrial vehicles that rely on battery power, the danger of damage to the vehicle from thermal runaway exists.

Catastrophic thermal runaway in battery packs typically generate intense heat and pressure, which can cause destructive damage to the vehicle. In any vehicle this can lead fires and critical failures, which is particularly problematic for airborne vehicles in flight.

What is needed is a battery pack structure and thermal management system for vehicle battery packs. In more specific applications, what is needed is a battery pack structure and thermal management system for high altitude sustained fight solar powered aircraft utilizing battery storage.

DESCRIPTION OF EXEMPLARY EMBODIMENTS

Figure 1:
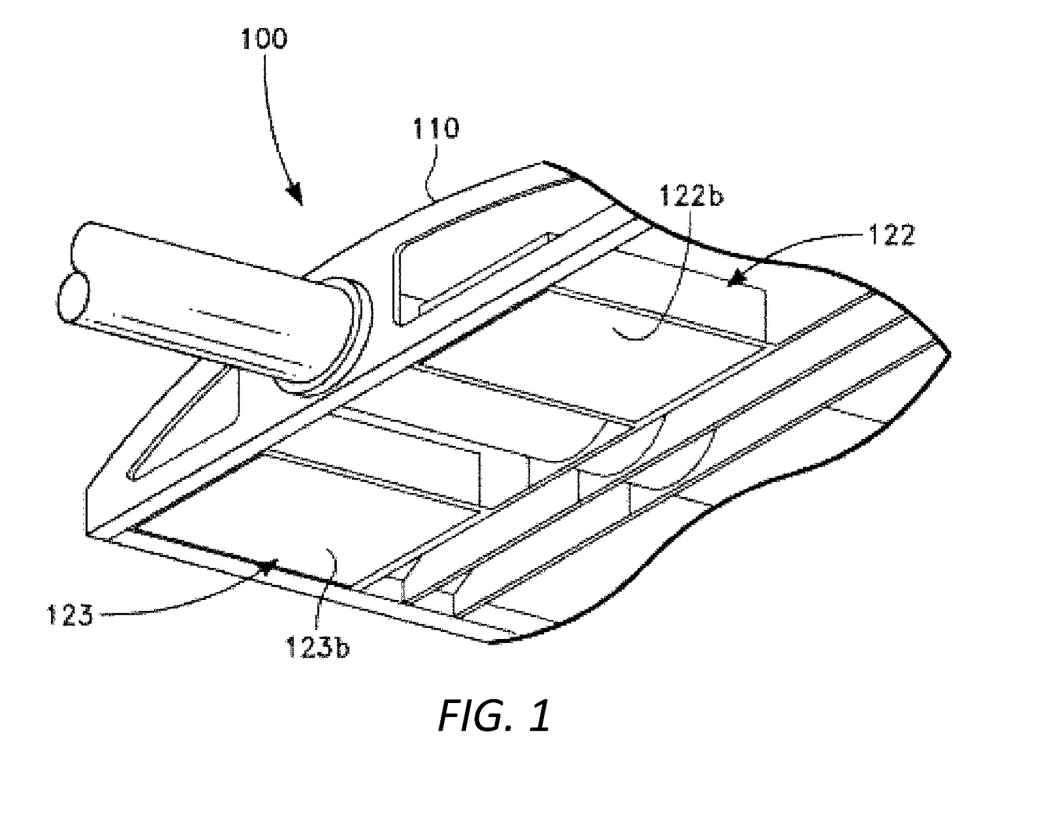
FIG. 1 is a cut away perspective view of showing the structural framework of a portion of an aircraft wing, viewed from the underside of the wing.

FIG. 1 shows the structural framework 100 of a portion of an aircraft wing 110, viewed from the underside of the wing 110. The battery packs 122 and 123 are mounted into the wing 110 so that the bottom surface 122b and 123b of the battery packs become the outer surface of the wing 110. Thus, the bottom surface 122b and 123b of the battery packs 122 and 123 will be in the airstream on the underside of the wing 110 when in the aircraft is in flight.

Figure 2:
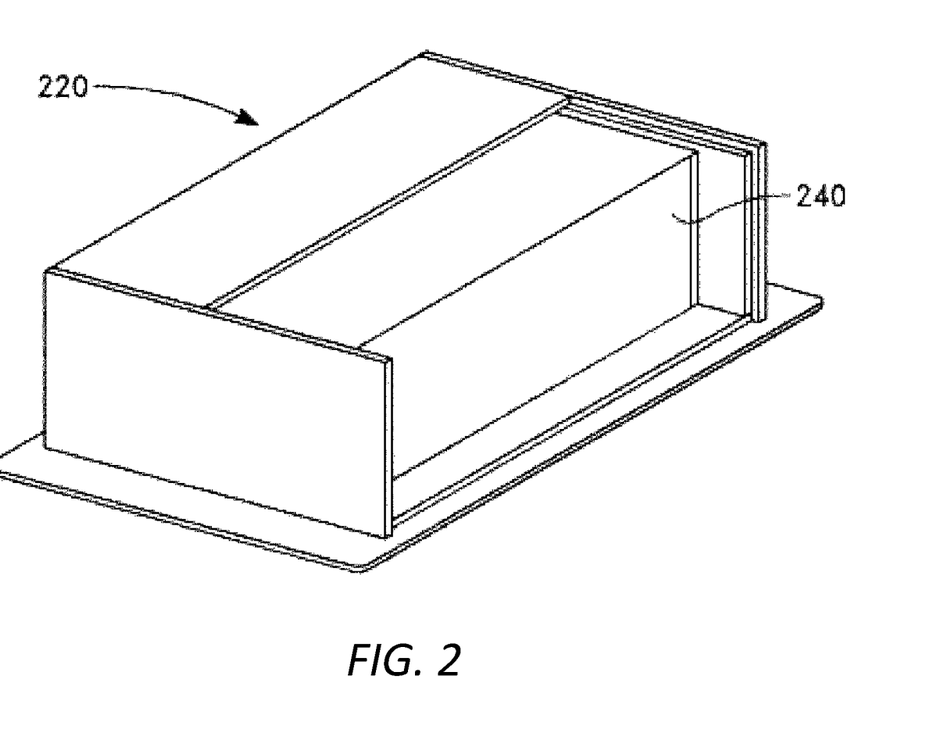
FIG. 2 is a cut away perspective view of a battery pack.

Turning to FIG. 2, the battery pack 220 contains battery cells (not shown) which are contained within a thin metal fire box 240. In one embodiment, the fire box 240 is made of 1½ thousandths inch thickness stainless steel, or the like. In one embodiment, the fire box 240 makes use of titanium as a fire barrier.

Figure 3:
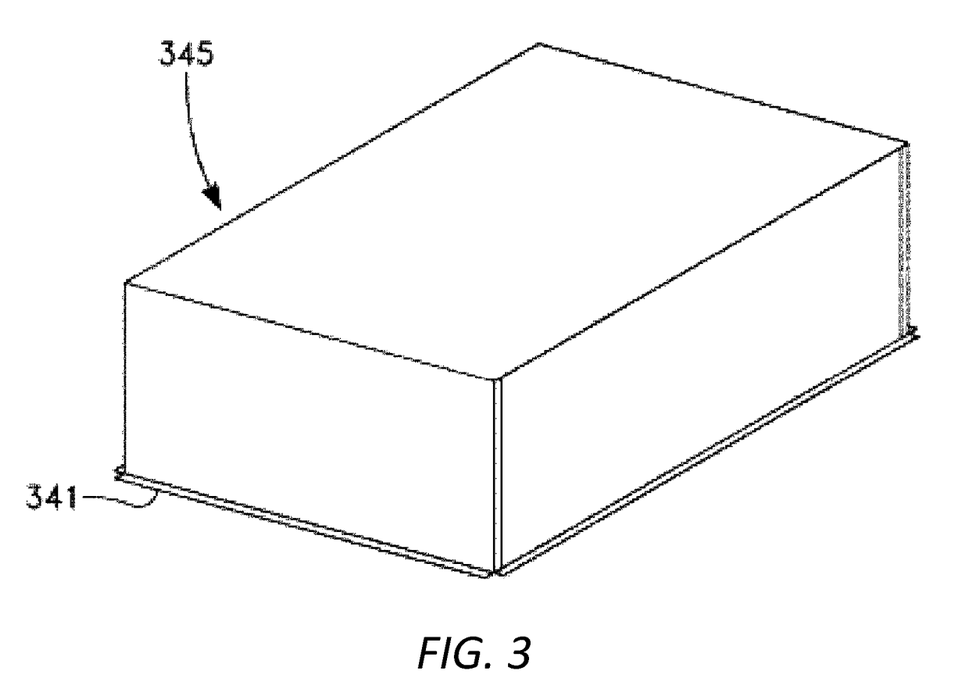
FIG. 3 illustrates a perspective view of a fire box enclosure.

Turning to FIG. 3, in one embodiment, the fire box 240 (FIG. 2) includes a fire box enclosure 345 that is a five sided box shape that can be placed over battery cells to contain the cells within. The enclosure 345 has a flange 341 which will mount with a fire box base (not shown in FIG. 3).

Figure 4:
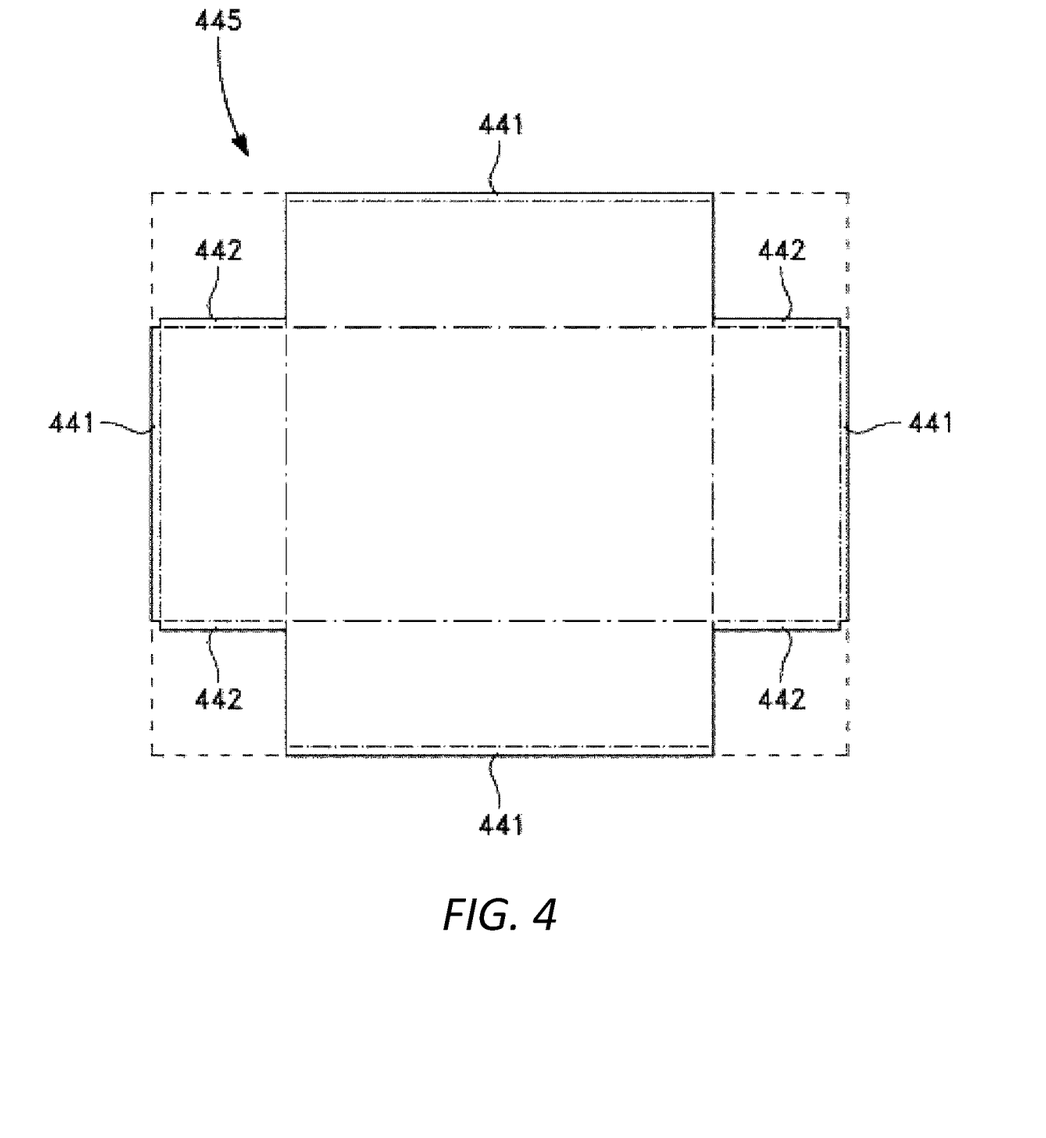
FIG. 4 Illustrates a plan view of an enclosure cut out.

FIG. 4 illustrates an enclosure metal cut out 445, which will be folded and bonded together, such as by welding, to form the enclosure 345 (FIG. 3). The cut out 445 includes flaps 442 for bonding with adjacent sides, such as by seam welding, when folded into the enclosure lid 345. The base flange flaps 441, will be folded to form the flange 341 (FIG. 3), which will mount with the base of the fire box (not shown in FIG. 3).

Figure 5:
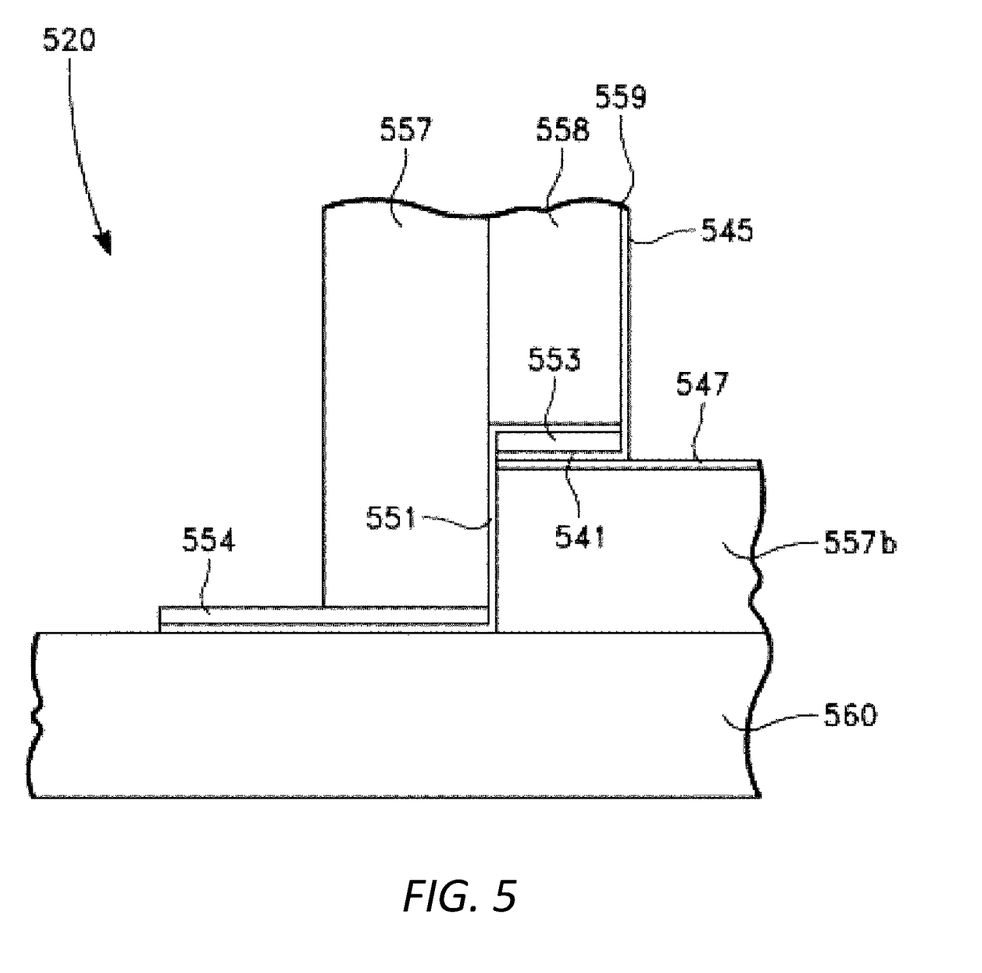
FIG. 5 shows a cut away cross sectional side view of a portion of the battery pack.

FIG. 5 shows a cross sectional view of a portion of the battery pack 520 depicting the mounting detail of the enclosure 545 to the fire box base 547, which may also be stainless steel, titanium, very high temp light weight alloys, or the like. The fire box base 547 is larger than the opening of the enclosure 545 so that the flange 541 mates with and along the fire box base 547. A base flange reinforcement 553 is placed on an exterior of the enclosure flange 541. A securing flange 551, which may also be stainless steel, holds the flange reinforcement 553 against the enclosure flange 541, and secures it. Top flange reinforcement 554 holds the securing flange 551 to the base plate 560. An interior layer 558 of polyimide foam, such as SOLIMIDE, is provided to insulate against extreme heat of generated during thermal runaway, while a prime exterior layer 557 of aerogel or vacuum panel insulation, such as NANOPORE, surrounds the SOLIMIDE interior layer 558, and an insulating layer 557b of aerogel insulation, such as NANOPORE, is located under the fire box base 547, to contain the heat to protect the surrounding airframe. Pyrolytic Graphite Sheet (PGS) (not shown) may be provided at interface 559 between the fire box enclosure 545 and the SOLIMIDE polyimide foam interior layer 558 to spread heat and help with transfer heat from the fire box enclosure 545 with variable conductance heat pipes (not shown), and to inhibit, or even prevent, localized hot spots in general and during thermal runaway. In some embodiments, pyrolytic graphite sheet may also be adhered to the interior surface of the fire box enclosure 545 for further protection.

Thus, in one embodiment, the battery enclosure makes use of stainless steel as a fire barrier. The prime insulation is made up of vacuum sealed NANOPORE aerogel insulation, which is spaced away from the firewall by a layer of SOLIMIDE polyimide foam. The prime insulation made up of vacuum sealed NANOPORE aerogel insulation is further encapsulated with a reinforced polyimide film, such as reinforced KAPTON. This is especially lightweight insulation that is ideal for aircraft.

Figure 6:
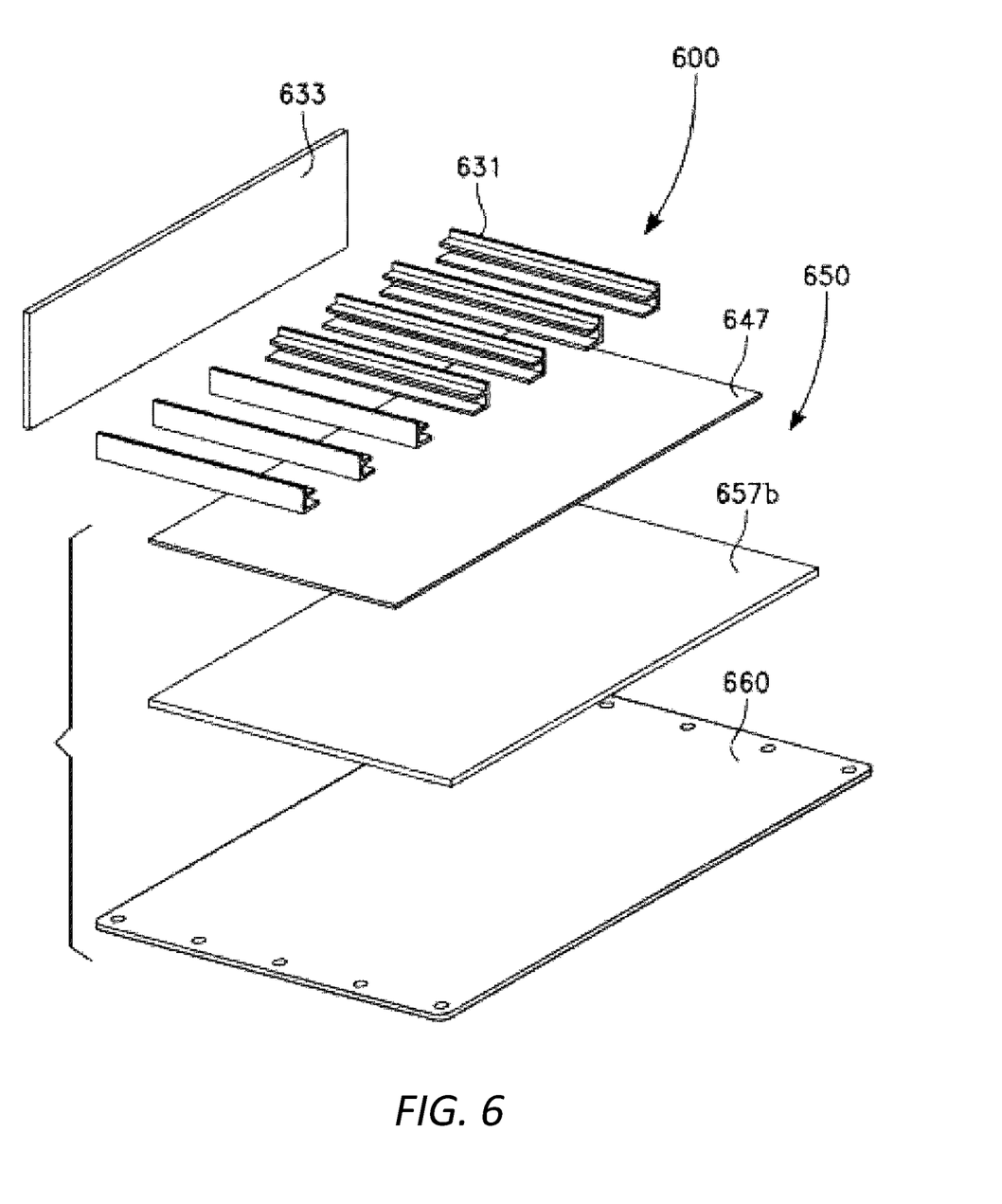
FIG. 6 is a perspective view showing an exploded view of the base structure.

FIG. 6 shows an exploded view of the base assembly 600, which includes the fire box base 647, the bottom NANOPORE aerogel insulation 657b, and the base plate 660. To prevent thermal leaks, the battery cell support structure, i.e. battery cell rails 631 and a battery preload plate 633 is bonded to the stainless steel firebox base layer 647, which itself is adhered to the NANOPORE aerogel insulation 657b.

With some embodiments, in attaching the firewall to the base plate which may be an aircraft exterior panel, the batteries need to sit on a stack of insulation because the bottom base plate may be exposed to ambient temperatures. So, aerogel is placed on top of the base plate. The NANOPORE or aerogel isn't guaranteed to survive, or at least the outer vacuum seal covering is not guaranteed to survive. In order to not to lose mechanical integrity while thermal runaway is happening, the entire structure has a peripheral foundation of ceramic material (not shown). So, the firewall is actually seated on top of a foundation of ceramic insulation material. Although the ceramic is at least 10 times worse insulation value than the aerogel, it provides better structural support during a runaway. Further, the peripheral ceramic structure proves better support for mounting on, as it is durable enough to use with mechanical fasteners, such as screws, bolt, or the like. The aerogel may then be placed within the perimeter of ceramic material surrounding it, and supporting the firebox containing the battery within it. The ceramic material may be ZAL-15, by Zircar Ceramics, of Florida, NY and the NANOPORE aerogel vacuum panel insulation may be obtained from NanoPore Incorporated, Albuquerque, NM, or www.nanopore.com.

In some further embodiments, a layer of SOLIMIDE polyimide foam may be between firebox base and the NANOPORE aerogel.

In addition to the stainless steel firewall, part of the strategy for thermal runaway is instead of trying to contain a high pressure of a thermal run away, it is taken out far away from the internal airframe and components. This battery pack minimizes pressure build up associated with a thermal runaway event and relies on the stainless steel firewall to make sure no hot gas products get in the air frame. To prevent damage to the airframe, insulated vent plugs are implemented to vent gases external to the wing.

Figure 7:
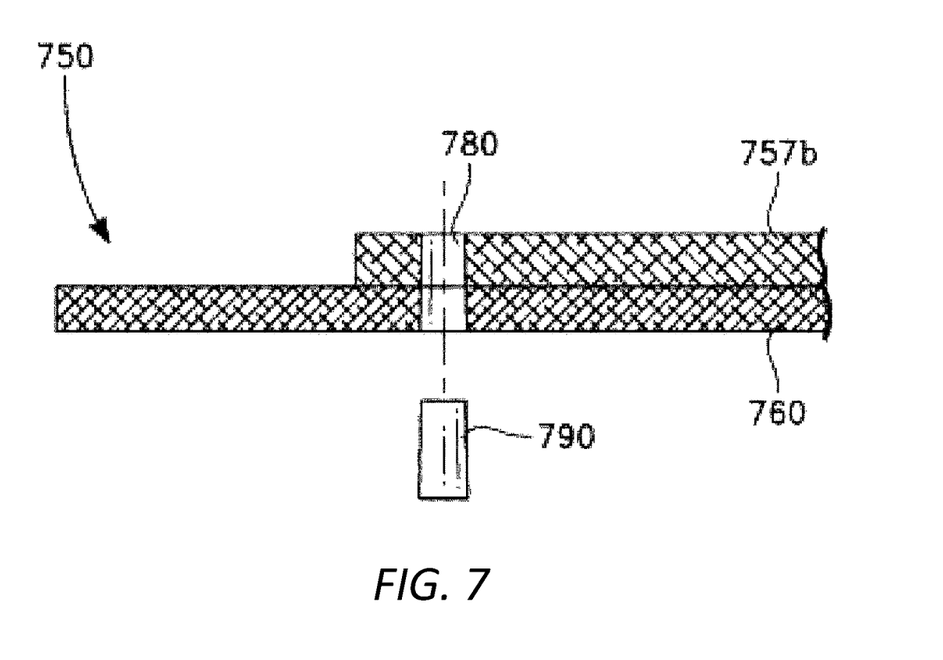
FIG. 7 cut away side view of a thermal runaway flame vent in accordance with and embodiment of the present invention.

Shown in FIG. 7 is a cut away side view of the base portion 750 showing a flame vent 780, which has a vent plug 790 normally within the flame vent 780, but which is forced out due to the pressure generated by thermal runaway. The flame vent 780 extends through the NANOPORE aerogel insulating base layer 757b and through the base plate 760. In some embodiments, it may additionally extend through the entire bottom structure 650 (FIG. 6), including the fire box base 647 (FIG. 6), depending on location of the vent 780 and the desired flow volume anticipated during a thermal runaway. If the bottom structure 650 contains additional layers, the vent could extend through any additional layer. The vent allows the hot gases developed during a thermal runaway to be vented to the exterior of an aircraft rather than venting into the aircraft potentially causing damage to the aircraft components and airframe. Such damage could be particularly problematic if the aircraft is in flight as it could cause catastrophic failure and jeopardize the entire aircraft and crew onboard.

Figure 8A:
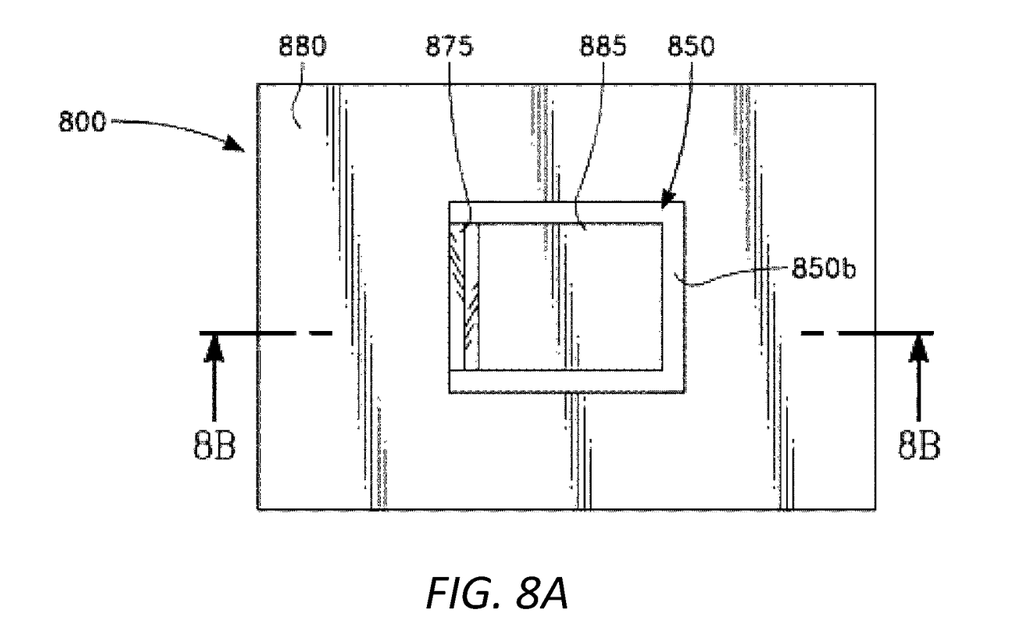
FIG. 8A is a top view of a pressure relief cover structure having a frangible vent cover in accordance with an embodiment of the present invention.

Shown in FIG. 8A is a top view of a pressure relief cover structure 800 having a frangible vent cover 885 in accordance with and embodiment of the present invention. Referring to FIGS. 7 and 8A, the frangible vent cover 885 holds in the plug 790, when there is no thermal runaway failure. The surrounding material 880 may be used to secure it to the underside of the battery pack, such as to the exterior facing side of the base plate 760. Or, in some embodiments it may be placed inside the battery pack, such as between the insulating layer 757b and the exterior layer 760.

Figure 8B:
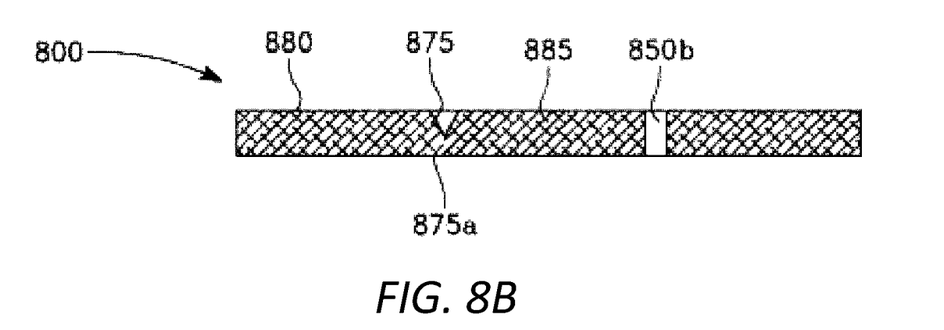
FIG. 8B is a side view of a pressure relief cover structure of FIG. 8A taken along the 8B-8B line.

FIG. 8B is a side view of a pressure relief cover structure 800 of FIG. 8A taken along the 8B-8B line. The vent cover may be fabricated by scoring the cover to provide a break away line 875 so that the pressure of a thermal runaway will cause the vent cover 885 to break off at a weakened region 875a under the score 875 as shown in FIG. 8C.

Figure 8C:
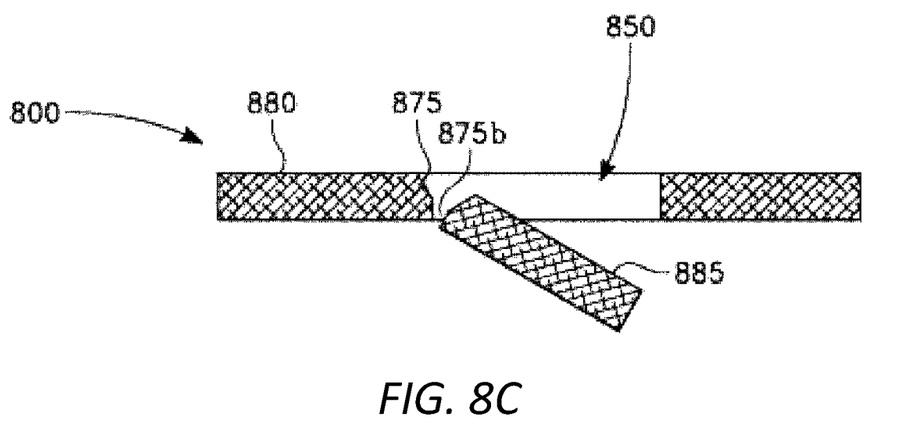
FIG. 8C is a side view of a pressure relief cover structure of FIG. 8B after the frangible vent cover breaks away.

FIG. 8C shows a side view of the pressure relief cover structure of FIG. 8B after a thermal runaway event causes the frangible vent cover 885 to break away and detach at a break or fracture region 875b. During a thermal runaway all the gases are vented straight out the bottom of the aircraft. But it is not possible to have an open vent to the atmosphere that is sufficient to vent a thermal runaway. For this, a super low pressure, super lightweight thermal run-away device vent is provided that is not going to hold any pressure. It is a pressure relief frangible vent cover design to substantially, but not completely cover the vent. In any thermal runaway event, a large amount of gases develops. The frangible vent cover is not designed to hold any pressure, but will break away to keep the gases from going into the airframe and damaging the aircraft.

A frangible flexure 885 is used in order to accomplish this. A pad or cover structure 800 is attached to the rest of the battery base. A very thin piece of G10 or FR4, or other similar composite material like fiberglass, that has consistent properties is tuned to have a predetermined breaking region in both force required and location of break. A score line 875 is added to this so that the cover structure 800 is strong enough so during takeoff, turbulence, etc. that the frangible cover or door does not fly open and release the plug. But, when a certain predetermined internal pressure differential is achieved, for example, at about 1.0 psi or less, or in some embodiments about ½ psi or less, or in yet others about ¼ psi or less, it will break away to allow venting of the thermal runaway gases from inside the battery pack to the outside of the aircraft. At that point, that battery pack is lost, but at least the airframe is protected.

To prevent the cover 885 from breaking due to pressure differential from changes in altitude, in some embodiments, there is provided enough space in the gap 850b between the surrounding material 880 and the cover 885 to allow some air leakage, to allow pressure equalization as the aircraft ascends and descends.

The scoring 875 of the vent cover 885 may be accomplished with a miniature table saw, tilted to 45 degrees, with the axial height set very precisely. The saw may be run across the vent covers so they create very consistent depth cuts. For example, to form the score 875, the depth is adjusted to only partially cut into the cover structure 800 to cut a "V" like profile groove by cutting on a single side, or by cutting both sides of the "V". The saw angle and axial height may be adjusted to cut the channel opening 850b all the way through the cover structure 800 around the breakaway vent cover 885, leaving only the weakened region 875a under the score 875. The miniature table saw is set to appropriate depth positions and corresponding angles, for forming the score line 875 and/or the channel opening 850b. Other known cutting and scoring techniques may be employed, such as lasering, routing, stamping, thermal cutting, drilling, etc. For example, perforations or the like may be utilized instead of or in conjunction with the saw cuts to form the weakened region that will determine or control where the vent cover will fracture from the surrounding structure, such that the plug is released from the vent to open the vent and relieve the pressure of a thermal run away. In yet another embodiment, the cover structure may be fabricated with a weaker region, for example a region with less material or thinner material than the adjacent or entire surrounding region and/or the vent cover, or a different more brittle material than the adjacent or entire surrounding region and/or than the vent cover to determine or control where the vent cover will fracture from the surrounding structure, such that the plug is released from the vent to open the vent and relieve the pressure of a thermal run away. Thus, the pressure relief frangible vent cover is adapted to at least partially cover the vent hole plug to retain the vent hole plug in the vent hole until the thermal runaway gases exert a force on the vent hole plug sufficient to force the vent hole plug from the vent hole by forcing the vent hole cover to yield and release the vent hole plug from the vent hole in response to the pressure of the vent hole plug on the vent hole cover.

Thus, in various embodiments the pressure relief frangible vent cover is adapted to at least partially cover the vent hole plug to retain the vent hole plug in the vent hole until the thermal runaway gases exert a force on the vent hole plug sufficient to force the vent hole plug from the vent hole by forcing the vent hole cover to yield and release the vent hole plug from the vent hole in response to the pressure of the vent hole plug on the vent hole cover.

As such, in various embodiments, the weakened region may be the sole connection to the surrounding material support for the vent hole cover. In at least some embodiments, the surrounding material is a mount used to mount the cover structure to the battery pack base plate. In some embodiments, the mount need not completely, or partially surround the vent hole cover, but instead could just extend from the weakened region for mounting purposes.

The frangible vent cover may be provided for a structural design that integrates a firewall, two different types of insulation, and variable conductance heat pipes to enable cooling of both battery and the MPPT or maximum power point tracker, and/or the motor controller unit, which may be situated adjacent to the battery in some embodiments.

Although discussed above with reference to a single vent hole and frangible cover, a battery pack may contain multiple vent holes and plugs, or/and multiple frangible covers.

Further, although the frangible vent cover is described and illustrated as completely detaching or separating from the surrounding material, it is possible in some embodiments that it could break away to release the vent plug while only partially detaching or separating from the surrounding material and not entirely detaching or separating.

It is worthy to note that any reference to "one embodiment" or "an embodiment" means that a particular feature, structure, or characteristic described in connection with the embodiment may be included in an embodiment, if desired. The appearances of the phrase "in one embodiment" in various places in the specification are not necessarily all referring to the same embodiment.

The illustrations and examples provided herein are for explanatory purposes and are not intended to limit the scope of the appended claims. This disclosure is to be considered an exemplification of the principles of the invention and is not intended to limit the spirit and scope of the invention and/or claims of the embodiment illustrated.

Those skilled in the art will make modifications to the invention for particular applications of the invention.

The discussion included in this patent is intended to serve as a basic description. The reader should be aware that the specific discussion may not explicitly describe all embodiments possible and alternatives are implicit. Also, this discussion may not fully explain the generic nature of the invention and may not explicitly show how each feature or element can actually be representative or equivalent elements. Again, these are implicitly included in this disclosure. Where the invention is described in device-oriented terminology, each element of the device implicitly performs a function. It should also be understood that a variety of changes may be made without departing from the essence of the invention. Such changes are also implicitly included in the description. These changes still fall within the scope of this invention.

Further, each of the various elements of the invention and claims may also be achieved in a variety of manners. This disclosure should be understood to encompass each such variation, be it a variation of any apparatus embodiment, a method embodiment, or even merely a variation of any element of these. Particularly, it should be understood that as the disclosure relates to elements of the invention, the words for each element may be expressed by equivalent apparatus terms even if only the function or result is the same. Such equivalent, broader, or even more generic terms should be considered to be encompassed in the description of each element or action. Such terms can be substituted where desired to make explicit the implicitly broad coverage to which this invention is entitled. It should be understood that all actions may be expressed as a means for taking that action or as an element which causes that action. Similarly, each physical element disclosed should be understood to encompass a disclosure of the action which that physical element facilitates. Such changes and alternative terms are to be understood to be explicitly included in the description.

Having described this invention in connection with a number of embodiments, modification will now certainly suggest itself to those skilled in the art. The example embodiments herein are not intended to be limiting, various configurations and combinations of features are possible. As such, the invention is not limited to the disclosed embodiments, except as required by the appended claims.

What is claimed is:

1. A battery pack for a vehicle, the battery pack comprising:
   a thin firebox for enclosing batteries and containing thermal runaway gases;
   thermal insulation surrounding the firebox;
   a vent hole extending through the firebox and the thermal insulation to an exterior of the vehicle;
   a vent hole plug; and
   a pressure relief frangible vent cover at least partially covering the vent hole plug to retain it within the vent hole, wherein
   the pressure relief frangible vent cover comprises:
      a frangible flexure comprising a vent plug cover portion and a weakened region; and
      a pad portion surrounding the frangible flexure, the pad portion being separated from the vent plug cover portion by a gap between the vent plug cover portion and the pad portion, the pad portion being connected to the frangible flexure by the weakened region.

2. The battery pack of claim 1, wherein the pressure relief frangible vent cover is adapted to at least partially cover the vent hole plug until the thermal runaway gases force the vent hole plug from the vent hole.

3. The battery pack of claim 1, wherein the weakened region comprises a score line.

4. The battery pack of claim 1, wherein the weakened region comprises a groove.

5. The battery pack of claim 4, wherein the weakened region comprises a "V" profile groove.

6. The battery pack of claim 5, wherein the weakened region comprises a more brittle material than an adjacent portion of the pad portion.

7. The battery pack of claim 1, wherein the weakened region comprises perforations.

8. The battery pack of claim 1, wherein the weakened region comprises a thinner material than an adjacent portion of the pad portion.

9. The battery pack of claim 1, wherein the thermal insulation comprises at least one of an aerogel or a vacuum panel insulation.

10. A battery pack thermal runaway vent cover structure comprising:
    a frangible flexure comprising a vent plug cover portion and a weakened region; and
    a pad portion surrounding the frangible flexure, the pad portion being separated from the vent plug cover portion by a gap between the vent plug cover portion and the pad portion, the pad portion being connected to the frangible flexure by the weakened region.

11. The battery pack thermal runaway vent cover structure of claim 10, wherein the weakened region comprises a score line.

12. The battery pack thermal runaway vent cover structure of claim 10, wherein the weakened region comprises a groove.

13. The battery pack thermal runaway vent cover structure of claim 12, wherein the weakened region comprises a "V" groove.

14. The battery pack thermal runaway vent cover structure of claim 13, wherein the weakened region comprises a more brittle material than an adjacent portion of the pad portion.

15. The battery pack thermal runaway vent cover structure of claim 10, wherein the weakened region comprises perforations.

16. The battery pack thermal runaway vent cover structure of claim 10, wherein the weakened region comprises a thinner material than an adjacent portion of the pad portion.

* * * * *